United States Patent [19]

Smith

[11] 4,095,506
[45] Jun. 20, 1978

[54] POSITION INDICATOR FOR GUITARS

[76] Inventor: Walter E. Smith, P.O. Box A, Payette, Id. 83661

[21] Appl. No.: 758,194

[22] Filed: Jan. 10, 1977

[51] Int. Cl.² ............................................. G09B 15/06
[52] U.S. Cl. ..................................... 84/485 R; 84/314
[58] Field of Search ................ 84/173, 267, 285, 290, 84/293, 312 P, 314, 319, 328, 453, 465, 477 R, 485

[56] References Cited

U.S. PATENT DOCUMENTS

| | | | |
|---|---|---|---|
| 663,187 | 12/1900 | Ropp | 84/314 |
| 939,486 | 11/1909 | Fish | 84/314 |
| 967,507 | 8/1910 | Finney | 84/314 |
| 992,765 | 5/1911 | Garrett | 84/314 |
| 2,455,574 | 12/1948 | Feldman | 84/314 |
| 3,783,731 | 1/1974 | Pash | 84/173 |
| 3,785,239 | 1/1974 | Smith | 84/314 |
| 4,020,730 | 5/1977 | Hill | 84/173 |

Primary Examiner—Lawrence R. Franklin
Attorney, Agent, or Firm—Lyon & Lyon

[57] ABSTRACT

This invention is directed to a position indicator which is mounted along one margin of a set of strings of a musical instrument and includes a set of projections so arranged that, when engaged by a slide bar placed across the strings, a preselected chord may be produced, the projections being deflectable so that the slide bar may be moved along the strings past a projection while maintaining contact with the strings.

9 Claims, 9 Drawing Figures

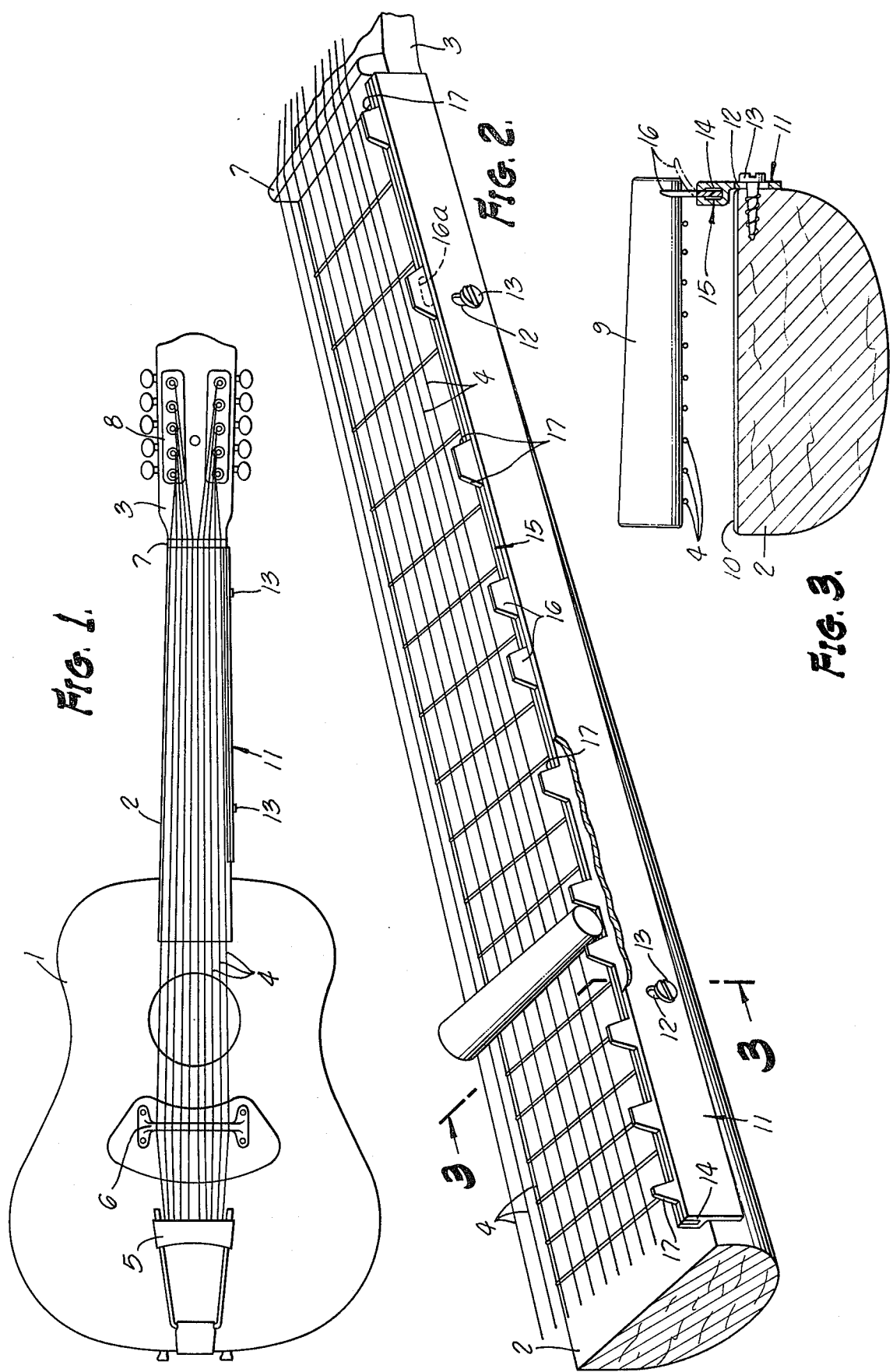

POSITION INDICATOR FOR GUITARS

BACKGROUND

Stringed instruments are provided with frets which aid in locating selected points at which the strings are intended to be played. Instruments which do not have frets have been provided with fixed or removable finger stops such as shown in U.S. Pat. No. 967,507. In the case of steel or Hawaiian guitars, which utilize hand held slide bars, fixed pegs and adjustable brackets have been used as shown in U.S. Pat. No. 3,785,239.

SUMMARY

The present invention is primarily intended for use with those stringed instruments which utilize a manually held slide bar, such as steel or Hawaiian guitars, including the block type steel guitars wherein the body extends the full length of the strings except for the head carrying the tuning units.

A primary object is to provide a position indicator which is readily used by an inexperienced or handicapped student such as a blind person for the purpose of playing chords; it being possible to identify the correct position of each major and minor chord of the scale.

A further object is to provide a position indicator which may be mounted along a margin of a set of strings, the indicator including a set or projections so arranged that, when engaged by a slide bar placed across the strings, a preselected chord may be produced, the projections being sufficiently flexible or otherwise yieldable that the slide bar may be moved passed the projection while remaining in contact with the strings.

A further object is to provide position indicating projections for stringed musical instruments which may be sensed by engagement with either end of a projection, rather than midway between the ends so that a single projection may identify two chord positions.

DESCRIPTION OF THE FIGURES

FIG. 1 is a plan view of a steel or Hawaiian guitar to which has been added a position indicator.

FIG. 2 is an enlarged fragmentary perspective view of the guitar neck showing the position indicator in place and showing a slide bar in conjunction with the position indicator.

FIG. 3 is a further enlarged transverse sectional view thereof taken through 3—3 of FIG. 2.

DETAILED DESCRIPTION

Figure 4:
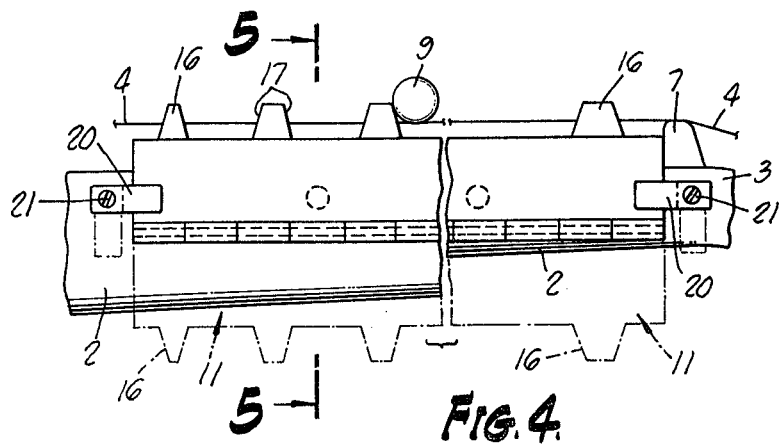
FIG. 4 is a fragmentary side view showing a modified embodiment of the position indicator.

While the present invention may be adapted to various stringed instruments utilizing a slide bar, it is particularly adapted for steel or Hawaiian guitars. In FIG. 1 there is illustrated a typical guitar which includes a guitar body 1, a neck 2 terminating in a head 3 over which is mounted strings 4 attached at one end to an anchor 5 and extending therefrom over a bridge 6 and a nut 7 at the head 3 and attached to appropriate tuning units 8.

The present invention utilizes a slide bar 9 which may take various forms, but is here illustrated as being essentially frusto-conical, that is, tapered and of a circular cross section.

The neck 2 may be provided with conventional frets 10 which however are not engaged by the strings 4 and thus serve merely as markers; that is, flush inlays or painted strips may be substituted for the frets.

Referring to FIGS. 2 and 3, one side of the neck receives a mounting strip 11 having slots 12 which receive screws 13 for attaching the mounting strip to the side of the neck 2. The mounting strip 11 projects above the upper surface of the neck 2 and is provided with an upwardly directed channel 14 which receives an indicator strip 15 formed of flexible material such as rubber or an elastomeric plastic material. The indicator strip may be placed in the channel and the flanges of the channel pressed toward each other to grip the mounting strip. A series of projections 16 extend upwardly from the indicator strip 15 to a height above the strings 4 which occupy a common plane. Each projection 16 is provided with upwardly converging edges forming abutments 17.

Each position indicator is sufficiently flexible that the slide bar may be moved past a projection 16 while the slide bar is in engagement with the strings as indicated in FIG. 3. If increased flexiblity is desired, the projections may be perforated as indicated by 16a in FIG. 2.

The abutements are so located that when a slide bar is held crosswise, with respect to the neck, and moved into contact with an abutment the strings, when struck, will produce a preselected chord. The number of abutments may be such that a few selected chords may be played or may be arranged so that the entire scale of chords may be played. More particularly, from the players position the natural chord such as C and F may be played with the bar against the abutments at the left side of the projections and the flats and sharps such as C# and F# are played with the bar in contact with the abutments at the right side of the projections. In order to accomplish this, some of the projections will be spaced a distance greater than the width of the bar and some will be spaced the diameter of the bar as indicated by the position of the bar 9 shown in FIG. 2.

Figure 5:
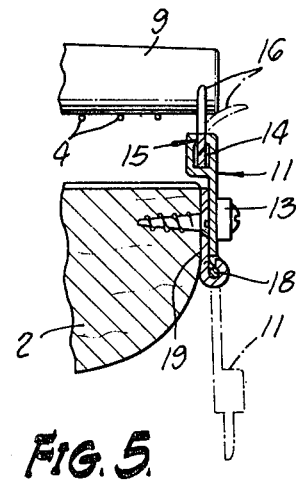
FIG. 5 is an enlarged fragmentary sectional view thereof taken through 5—5 of FIG. 4.

Referring to FIGS. 4 and 5, as the present invention is intended primarily to aid in the teaching of students, it is sometimes desirable to arrange the musical instrument so that it may be played with or without the position indicator. For this purpose the bottom of the mounting strip 11 is joined by a hinge 18 to a second mounting strip 19 which is secured to the side of the neck by screws 13. Pivotal end clips 20 secured by screws 21 are provided at the longitudinal ends of the mounting strips 11 and 19 so that the mounting strips 11 may be held in an operating position shown by solid lines in FIGS. 4 and 5, or a non operating position shown by broken lines therein.

Figure 6:
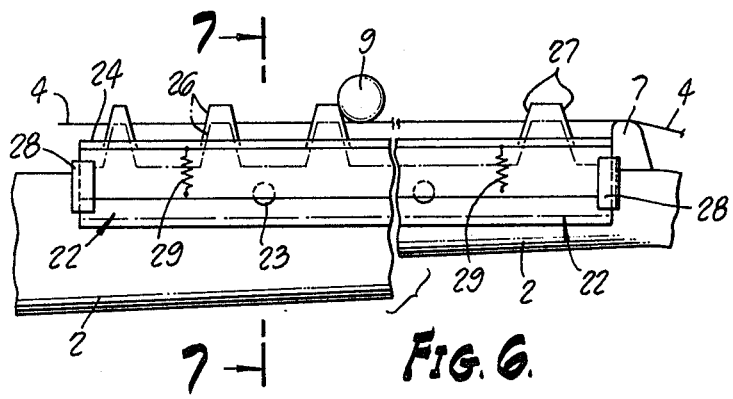
FIG. 6 is a fragmentary side view showing a further embodiment of the position indicator.
Figure 7:
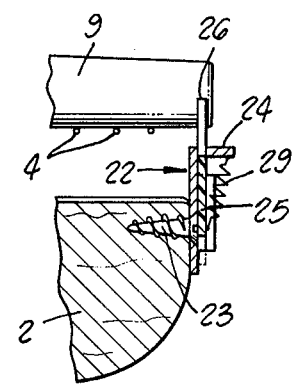
FIG. 7 is an enlarged fragmentary sectional view thereof taken through 7—7 of FIG. 6.

Referring to FIGS. 6 and 7, a guide strip 22 is secured by screws 23 to the side of the neck 2 and is provided with a perforated flange 24 extending horizontally outward from the neck 2. Overlying the guide strip 22 under the flange 24 is an indicator strip 25 having projections 26 which extend upwardly through the perforations provided in the flange 24. The dimensions of the projections 26 are similar to the dimensions of the projections 16 and are provided with sloping abutment ends 27. The indicator strip 25, however, is formed of relatively rigid plastic material. The indicator strip is retained against the guide strip 22 by retainer clips 28. If desired, intermediate retainer elements, not shown, may be provided. The indicator strip 25 is yieldably held with its projections 26 extending above the plane of the strings 4 by means of light springs 29.

Figure 8:
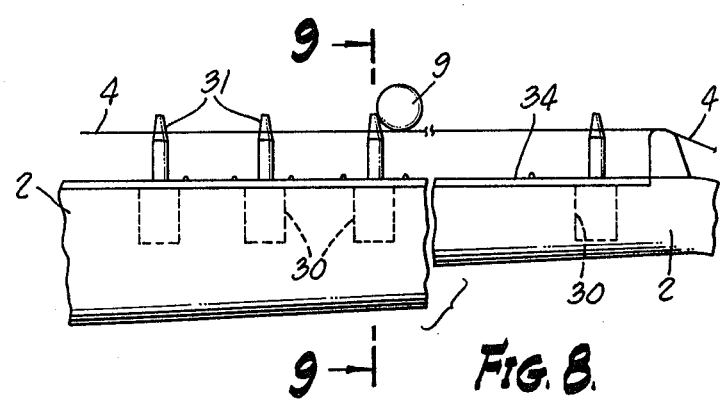
FIG. 8 is a fragmentary side view showing a further embodiment of the position indicator.
Figure 9:
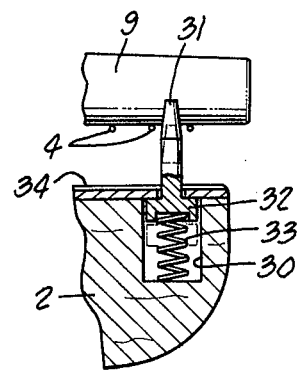
FIG. 9 is an enlarged fragmentary sectional view thereof taken through 9—9 of FIG. 8.

Referring to FIGS. 8 and 9, the neck 2 is provided with a series of sockets 30 in which are slidably mounted abutment pins 31 having flanges 32. The abutment pins are urged upwardly by springs 33 in the sockets 30. Such upward movement is limited by a retainer plate 34 placed over the neck 2.

Each of the embodiments illustrated are so arranged that the projections are readily moved downward so that the player may move the slide bar along the strings in contact therewith, the projections being readily moved by the slide bar so that the slide bar may be maintained in contact with the strings, when this is desired.

It should be noted that, while a conventional guitar with a neck is illustrated, a conventional block type of steel guitar may be used. This type does not have a neck; instead, the guitar body extends to the head.

Having fully described my invention it is to be understood that I am not to be limited to the details herein set forth, but that my invention is of the full scope of the appended claims.

I claim:

1. In a stringed musical instrument having a set of tensioned strings occupying a common plane overlying the instrument and adapted to be played with a manually held slide bar device, a position indicator comprising:
a series of longitudinally spaced projections extending above said common plane, each projection forming a pair of opposed longitudinally facing abutments engageable by said slide bar device upon longitudinal movement to place the slide bar device in preseleted locations with respect to said strings;
the projections being readily yieldably toward an inoperative position essentially coplanar with respect to the plane of said strings to permit, when desired, movement of the slide bar past the projections while remaining in contact with said strings.

2. The combination as set forth in claim 1 in which:
said projections are spaced along one lateral edge of said set of strings.

3. The combination as set forth in claim 1 in which:
said projections are formed of flexible material deflectable in a lateral direction to said inoperative position.

4. The combination as set forth in claim 1 in which:
said projections project from the instrument between selected strings.

5. The combination as set forth in claim 1 in which:
projections extend from a common strip adjustably mounted on the instrument along one lateral side of the set of strings.

6. The combination as set forth in claim 5 in which:
said common strip is hinged to said instrument for movement of the projections between an operative position and an inoperative position.

7. The combination as set forth in claim 5 in which:
said common strip is mounted for movement in a plane perpendicular to the plane of said strings, whereby said projections move as a unit;
and yieldable means extending between said common strip and neck normally maintains said projections in their operative positions above the plane of said strings.

8. Means utilizing a slide bar for aiding in the location of preselected positions on a stringed musical instrument, comprising:
supporting means disposed longitudinally with respect to the strings;
a set of projections carried by the supporting means normally extending above the strings and engageable by the slide bar to locate preselected positions on the strings;
said projections being deflectable to movement of the slide bar to permit such movement past a projection while maintaining contact between the slide bar and the strings.

9. A means as defined in claim 8, wherein:
the projections include inclined abutmnt edges to aid in guiding the slide bar into said preseleted positions, and to aid in deflecting a projection upon movement of the slide bar past said projection.

* * * * *